United States Patent
Miyake et al.

(10) Patent No.: US 11,348,347 B2
(45) Date of Patent: May 31, 2022

(54) IN-VEHICLE DEVICE

(71) Applicant: Yazaki Corporation, Tokyo (JP)

(72) Inventors: Hideto Miyake, Shizuoka (JP); Daiki Saito, Shizuoka (JP); Shinichi Okamoto, Shizuoka (JP); Koji Ishii, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 51 days.

(21) Appl. No.: 17/075,663

(22) Filed: Oct. 20, 2020

(65) Prior Publication Data

US 2021/0192240 A1    Jun. 24, 2021

(30) Foreign Application Priority Data

Dec. 18, 2019  (JP) .............................. JP2019-227828

(51) Int. Cl.
| | | |
|---|---|---|
| *G06K 9/00* | (2022.01) | |
| *G06K 9/52* | (2006.01) | |
| *G06V 20/59* | (2022.01) | |
| *G06V 10/42* | (2022.01) | |

(52) U.S. Cl.
CPC ............ *G06V 20/593* (2022.01); *G06V 10/42* (2022.01)

(58) Field of Classification Search
CPC .............................. G06V 20/593; G06V 10/42
See application file for complete search history.

(56) References Cited

U.S. PATENT DOCUMENTS

| 10,311,704 B1 | 6/2019 | Xu et al. | |
|---|---|---|---|
| 2019/0279487 A1* | 9/2019 | Hirose | ................. G05D 1/0088 |
| 2020/0024103 A1* | 1/2020 | Amuduri | .................. B66B 3/00 |

FOREIGN PATENT DOCUMENTS

| JP | 2011091705 | * | 5/2011 | ............... G06T 7/20 |
|---|---|---|---|---|
| JP | 2015-23459 A | | 2/2015 | |
| JP | 2018-142130 A | | 9/2018 | |

* cited by examiner

*Primary Examiner* — David F Dunphy
(74) *Attorney, Agent, or Firm* — Kenealy Vaidya LLP

(57) ABSTRACT

An in-vehicle device includes a camera, a passenger detector, a goods detector, an association unit, and an in-vehicle controller. The camera images the inside of a vehicle. The passenger detector detects the passenger inside the vehicle based on an image captured by the camera. The goods detector detects the goods inside the vehicle based on the image captured by the camera. The association unit generates association information. The association information is obtained by associating specific goods detected by the goods detector with a specific passenger detected by the passenger detector based on the goods detected by the goods detector and the passenger detected by the passenger detector. The in-vehicle controller performs predetermined control based on the association information generated by the association unit.

3 Claims, 3 Drawing Sheets

| PASSENGER | GOODS (BELONGINGS) |
|---|---|
| PASSENGER P1 | HANDBAG (BLACK) |
| | SMARTPHONE |
| PASSENGER P2 | NO BELONGINGS |
| PASSENGER P3 | BACKPACK (BLACK) |
| | PET BOTTLE |
| PASSENGER P4 | HANDBAG (WHITE) |
| | HANDKERCHIEF |
| . | |
| . | |
| . | |

| PASSENGER | GOODS (BELONGINGS) |
|---|---|
| PASSENGER P1 | HANDBAG (BLACK) |
| | SMARTPHONE |
| PASSENGER P2 | NO BELONGINGS |
| PASSENGER P3 | BACKPACK (BLACK) |
| | PET BOTTLE |
| PASSENGER P4 | HANDBAG (WHITE) |
| | HANDKERCHIEF |
| . | |
| . | |
| . | |

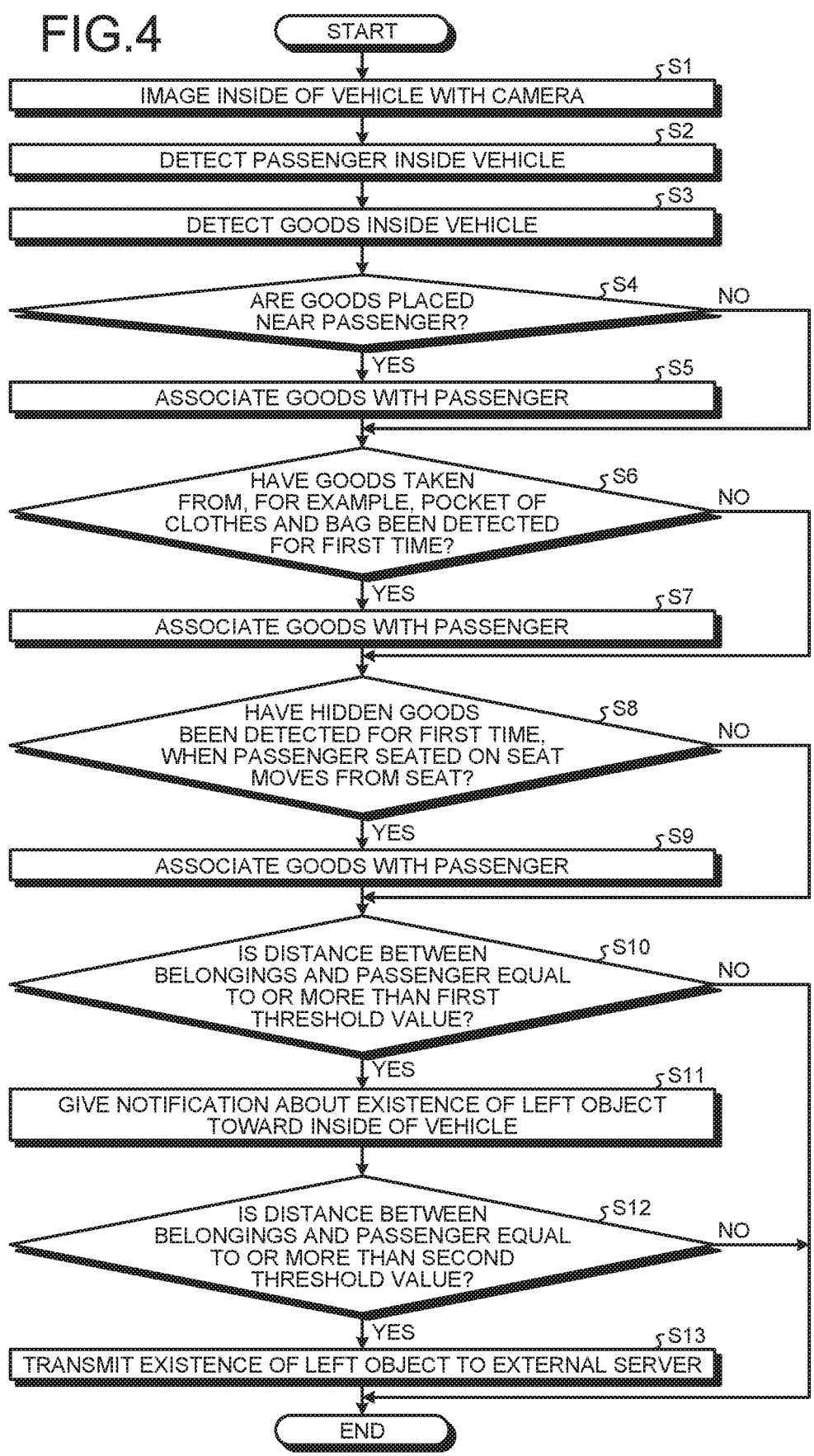

IN-VEHICLE DEVICE

CROSS-REFERENCE TO RELATED APPLICATION(S)

The present application claims priority to and incorporates by reference the entire contents of Japanese Patent Application No. 2019-227828 filed in Japan on Dec. 18, 2019.

BACKGROUND OF THE INVENTION

1. Field of the Invention

The present invention relates to an in-vehicle device.

2. Description of the Related Art

For example, Japanese Patent Application Laid-open No. 2018-142130 discloses an in-vehicle device that determines that a user has left an object inside a vehicle as a traditional in-vehicle device. The in-vehicle device determines the left object based on the difference between the weight of the user at the time of getting on the vehicle and the weight of the user at the time of getting off the vehicle.

By the way, the in-vehicle device disclosed in Japanese Patent Application Laid-open No. 2018-142130 above has room for further improvement in, for example, proper determination for an object that has been left inside a vehicle by a user. Then, the in-vehicle device is desired to grasp belongings of a user including determination of a left object.

SUMMARY OF THE INVENTION

Consequently, the present invention has been made in view of the above, and an object thereof is to provide an in-vehicle device capable of appropriately grasping the belongings of a passenger.

In order to solve the above mentioned problem and achieve the object, an in-vehicle device according to one aspect of the present invention includes an imager that images an inside of a vehicle; a passenger detector that detects a passenger inside the vehicle based on an image captured by the imager; a goods detector that detects each of goods inside the vehicle based on the image captured by the imager; an association unit that generates association information by as a specific one of the goods detected by the goods detector with a specific passenger detected by the passenger detector based on goods detection information representing each of the goods detected by the goods detector and passenger detection information representing the passenger detected by the passenger detector; and a controller that performs predetermined control based on the association information generated by the association unit.

According to another aspect of the present invention, in the in-vehicle device, it is preferable that the association unit associates the specific one of the goods with the specific passenger based on a distance between each of the goods detected by the goods detector and the passenger detected by the passenger detector.

According to still another aspect of the present invention, in the in-vehicle device, it is preferable that when the goods detector detects each of goods for a first time, the association unit associates each of the goods that have been detected for the first time with a passenger closest in distance to each of the goods that have been detected for the first time.

According to still another aspect of the present invention, in the in-vehicle device, it is preferable that when a distance between each of the goods and the passenger, which has been associated by the association unit, is equal to or more than a predetermined threshold value, the controller determines that the passenger has left each of the goods inside the vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating an operation example of an in-vehicle device according to the embodiment.

DETAILED DESCRIPTION OF THE PREFERRED EMBODIMENTS

An embodiment for carrying out the present invention (embodiment) will be described in detail with reference to the drawings. The present invention is not limited to the contents described in the following embodiment. Furthermore, the components described below include those that can be easily assumed by a skilled person and those that are substantially the same. Moreover, the configurations described below can be appropriately combined. Furthermore, various omissions, substitutions, or changes of a configuration can be made without departing from the gist of the present invention.

Embodiment

Figure 1:
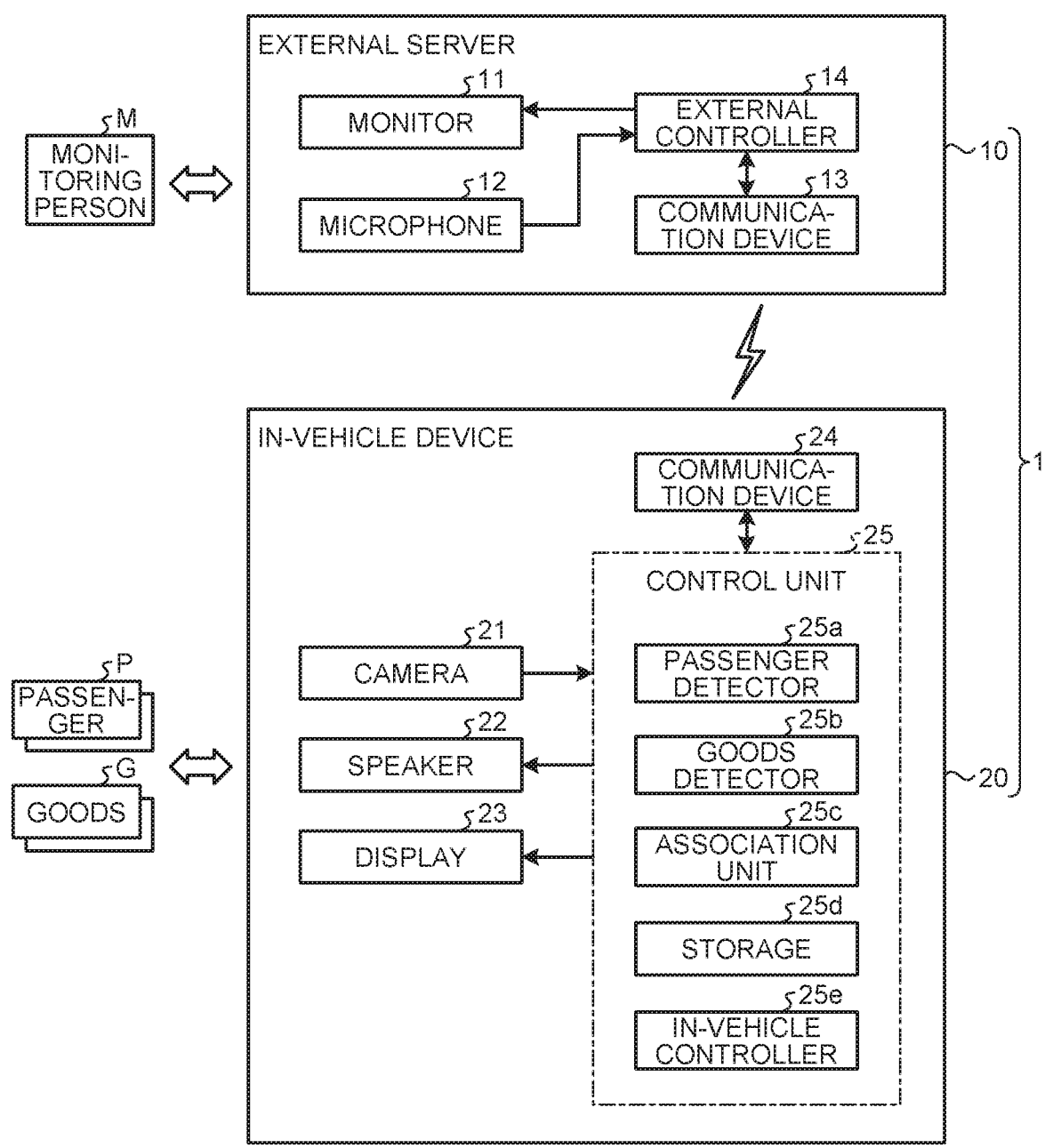
FIG. 1 is a block diagram illustrating a configuration example of a vehicle system including an in-vehicle device and an external server according to an embodiment.
Figures 2, 3:
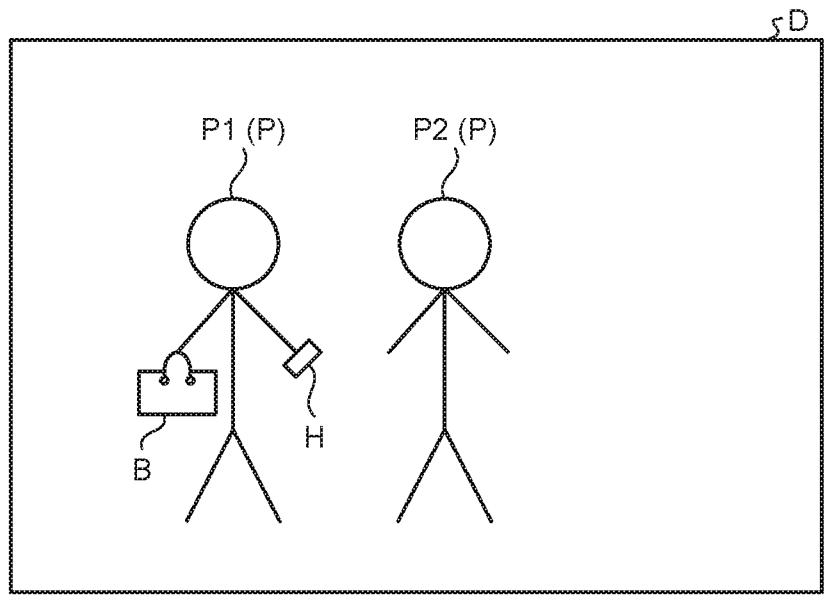
FIG. 2 illustrates a detection image captured by a camera according to the embodiment.
FIG. 3 illustrates the association between a passenger and his/her belongings according to the embodiment.

A vehicle system 1 according to an embodiment will be described with reference to the drawings. FIG. 1 is a block diagram illustrating a configuration example of the vehicle system 1 including an in-vehicle device 20 and an external server 10 according to the embodiment. FIG. 2 illustrates a detection image D captured by a camera 21 according to the embodiment. FIG. 3 illustrates the association between a passenger P and his/her belongings according to the embodiment. The vehicle system 1 gives notification that the passenger P has left his/her belongings on a vehicle V. The vehicle system 1 is applied to the vehicle V such as a ride-sharing car, a bus, and a taxi that perform automatic driving, for example. The vehicle system 1 includes the external server 10 and the in-vehicle device 20.

The external server 10 supports a monitoring person M to monitor the vehicle V. The external server 10 is provided outside the vehicle V, and includes a monitor 11, a microphone 12, a communication device 13, and an external controller 14.

The monitor 11 displays information. The monitor 11 is connected to the external controller 14, and displays an inside image (moving image or still image) of the vehicle V output from the external controller 14. The monitoring person M monitors the indoor situation of the vehicle V by viewing the inside image of the vehicle V displayed on the monitor 11.

The microphone 12 converts sound into an electric signal. The microphone 12 converts, for example, voice emitted by the monitoring person P into an electric signal. The microphone 12 is connected to the external controller 14, and outputs an electric signal obtained by converting voice to the external controller 14.

The communication device 13 wirelessly communicates with the in-vehicle device 20. The communication device 13 is connected to the external controller 14, and transmits information output from the external controller 14 to the in-vehicle device 20. Furthermore, the communication device 13 outputs information received from the in-vehicle device 20 to the external controller 14.

The external controller 14 controls various electronic devices. The external controller 14 includes an electronic circuit mainly composed of a known microcomputer. The microcomputer includes a CPU, a ROM constituting a memory, a RAM, and an interface. The external controller 14 is connected to the communication device 13 and the monitor 11, and outputs the inside image of the vehicle V acquired via the communication device 13 to the monitor 11. The external controller 14 is connected to the microphone 12, and transmits an electric signal of voice output from the microphone 12 to the in-vehicle device 20 via the communication device 13.

The in-vehicle device 20 gives notification about an object left inside the vehicle V. The in-vehicle device 20 includes the camera 21 as an imager, a speaker 22, a display 23, a communication device 24, and a control unit 25.

The camera 21 images the inside of the vehicle V. The camera 21 includes, for example, a monocular camera and a stereo camera. The monocular camera includes one imager. The stereo camera includes two imagers. One or a plurality of cameras 21 is provided inside the vehicle V, and images the inside of the vehicle V containing the passenger P who has got on the vehicle V. One or a plurality of cameras 21 is set to have an angle of view with which the entire inside of the vehicle V can be imaged. While the vehicle V is in use, the camera 21 images the inside of the vehicle V regardless of whether the vehicle V is running or stopped. The camera 21 images the passenger P from the moment when the passenger P gets on the vehicle V to the moment when the passenger P gets off the vehicle V. That is, the camera 21 continually images the passenger P and the belongings of the passenger P for the time period when the passenger P gets on the vehicle V, the passenger P who has got on sits on a seat, and the seated passenger P gets off the vehicle V. The camera 21 is connected to the control unit 25, and outputs the captured detection image 11) (see FIG. 2) to the control unit 25.

The speaker 22 converts an electric signal into sound. The speaker 22 is connected to the control unit 25. The speaker 22 converts a voice signal output from the control unit 25 into a sound wave (voice), and outputs the sound wave (voice) to the inside of the vehicle V. The speaker 22 converts, for example, a pre-recorded voice signal and an electric signal of voice emitted by the monitoring person M into a sound wave (voice), and outputs the sound wave (voice) into the inside of the vehicle V. The pre-recorded voice signal has a content that gives notification that the passenger P has left an object inside the vehicle V, and is stored in a storage 25d described later. The passenger P can notice that he/she has left an object inside the vehicle V by listening to voice output from the speaker 22.

The display 23 displays information. The display 23 is connected to the control unit 25, and displays an image (moving image or still image) output from the control unit 25. The image has a content that gives notification that the passenger P has left an object inside the vehicle V, and is preliminarily stored in the storage 25d. The passenger P can notice that he/she has left an object inside the vehicle V by visually recognizing the image displayed on the display 23.

The communication device 24 wirelessly communicates with the external server 10. The communication device 24 is connected to the control unit 25, and transmits information output from the control unit 25 to the external server 10. Furthermore, the communication device 24 outputs information received from the external server 10 to the control unit 25.

The control unit 25 determines an object left by the passenger P. The control unit 25 includes an electronic circuit mainly composed of a known microcomputer. The microcomputer includes a CPU, a RUM constituting a memory, a PAM, and an interface. The control unit 25 includes a passenger detector 25a, a goods detector 25b, an association unit 25c, a storage 25d, and an in-vehicle controller 25e serving as a controller.

The passenger detector 25a detects the passenger P inside the vehicle V based on the detection image D captured by the camera 21. The passenger detector 25a detects the passenger P by using, for example, a known image recognition technique such as a pattern recognition technique for recognizing a subject based on the characteristics of the detection image D. The passenger detector 25a is connected to the camera 21, and detects the passenger P who gets on the vehicle V based on the detection image D of the inside of the vehicle V captured by the camera 21. At this time, the passenger detector 25a identifies each part of the body of the passenger P. The passenger detector 25a identifies and detects parts such as, for example, the face, torso, upper limbs (arms and hands), and lower limbs of the passenger P. The passenger detector 25a is connected to the association unit 25c, and outputs unique passenger detection information representing the detected passenger P to the association unit 25c. Here, the passenger detection information is obtained by detecting the passenger P contained in the detection image D captured by the camera 21.

The goods detector 25b detects goods G inside the vehicle V based on the detection image D captured by the camera 21. The goods detector 25b detects the goods G by using, for example, a known image recognition technique such as a pattern recognition technique for recognizing a subject based on the characteristics of the detection image D. The goods detector 25b is connected to the camera 21, and detects the goods G inside the vehicle V based on the detection image D of the inside of the vehicle V captured by the camera 21. For example, when the passenger P brings a handbag (black), a smartphone, a backpack (black), a PET bottle, and the like into the inside of the vehicle V, the goods detector 25b detects these goods as the goods G. The goods detector 25b is connected to the association unit 25c, and outputs goods detection information representing the detected goods G to the association unit 25c. Here, the goods detection information is obtained by detecting the goods G contained in the detection image D captured by the camera 21.

The association unit 25c associates the goods G with the passenger P as belongings. The association unit 25c is connected to the goods detector 25b, and acquires the goods detection information representing the goods G detected by the goods detector 25b. Furthermore, the association unit 25c is connected to the passenger detector 25a, and acquires the passenger detection information representing the passenger P detected by the passenger detector 25a. Then, the association unit 25c generates association information T (see FIG. 3). The association information T is obtained by associating specific goods G detected by the goods detector 25b with a specific passenger P detected by the passenger detector 25a based on the goods detection information and the passenger detection information. The goods detection information represents the goods G detected by the goods detector 25b. The passenger detection information represents the passenger P detected by the passenger detector 25a.

The association unit 25c associates the specific goods G with the specific passenger P based on, for example, the distance between the goods G detected by the goods detector 25b and the passenger P detected by the passenger detector 25a. Here, the distance between the goods P and the passenger P means the distance between the goods G and a hand of the passenger P. The association unit 25c associates the goods P detected by the goods detector 25b with the passenger P having a hand closest to the goods G, for example. Typically, when the goods detector 25b detects the goods G for the first time, the association unit 25c associates the goods G detected for the first time with the passenger P having a hand closest in distance to the goods G detected for the first time. For example, as illustrated in the detection image D in FIG. 2, when a passenger P1, who has a handbag (black) B and a smartphone H, and a passenger P2 who does not have anything get inside the vehicle V, the passenger detector 25a detects the passengers P1 and P2, and the goods detector 25b detects the handbag (black) B and the smartphone H. Then, the association unit 25c generates the association information T (see FIG. 3). The association information T is obtained by associating the handbag (black) B and the smartphone H with the passenger P1 having a hand closest in distance to the handbag (black) B and the smartphone H. Furthermore, the association unit 25c records the passenger P2 who does not have anything in the association information T as "no belongings". Note that, in addition to the passengers P1 and P2, passengers P3 and P4 are recorded in the association information T in FIG. 3. The passenger P3 has a backpack (black) and a PET bottle. The passenger P4 has a handbag (white) and a handkerchief.

The storage 25d is a non-volatile memory that stores information. The storage 25d stores, for example, conditions and information necessary for various pieces of processing in the control unit 25, programs, applications, and control data for image recognition executed by the control unit 25. The storage 25d stores voice data (voice signal) of the content that gives notification that the passenger P has left an object inside the vehicle V. Furthermore, the storage 25d stores image data of the content that gives notification that the passenger P has left an object inside the vehicle V. Furthermore, the storage 25d stores the association information T. These pieces of information are read out as needed from the storage 25d by the passenger detector 25a, the goods detector 25b, the association unit 25c, and the in-vehicle controller 25e.

The in-vehicle controller 25e performs predetermined control based on the association information T generated by the association unit 25c. The in-vehicle controller 25e calculates the distance between the goods G and the passenger P associated by the association unit 25c based on the detection image D captured by the camera 21. Then, when the distance between the goods G and the passenger P associated by the association unit 25c is less than a predetermined first threshold value, the in-vehicle controller 25e determines that the passenger P has not left the goods G inside the vehicle V. In contrast, when the distance between the goods G and the passenger P associated by the association unit 25c is equal to or more than the first threshold value, the in-vehicle controller 25e determines that the passenger P has left the goods G inside the vehicle V. Here, the first threshold value is a distance indicating that the passenger P has left the goods G inside the vehicle V.

When determining that the passenger P has left the goods G inside the vehicle V, the in-vehicle controller 25e notifies the passenger P that he/she has left an object. The in-vehicle controller 25e outputs the content indicating that the passenger P has left an object inside the vehicle V from the speaker 22 to the inside of the vehicle V based on voice data preliminarily recorded in the storage 25d. Furthermore, the in-vehicle controller 25e displays the content indicating that the passenger P has left an object inside the vehicle V on the display 23 based on image data preliminarily stored in the storage 25d. When the passenger P does not notice that he/she has left an object despite the notification about the left object via the speaker 22 and the display 23, that is, when the passenger P moves away from the goods G despite the notification about the left object, the in-vehicle controller 25e transmits the content (including an inside image of the vehicle V) indicating that the passenger P has not noticed the left object to the external server 10. When receiving the content indicating that the passenger P has not noticed the left object from the in-vehicle controller 25e, the external server 10 displays the inside image of the vehicle V on the monitor 11. The monitoring person M views the inside image of the vehicle V displayed on the monitor 11, and notifies the passenger P that he/she has left an object inside the vehicle V through the microphone 12. The external server 10 transmits the content about which the monitoring person P gives notification to the in-vehicle device 20. The in-vehicle device 20 outputs the content, which has been transmitted from the external server 10 and about which the monitoring person M gives notification, from the speaker 22 to the inside of the vehicle V.

Next, the operation of the in-vehicle device 20 will be described with reference to a flowchart. FIG. 1 is a flowchart illustrating an operation example of the in-vehicle device 20 according to the embodiment. In the in-vehicle device 20, the camera 21 mages the inside of the vehicle V (Step S1). The passenger detector 25a detects the passenger P inside the vehicle V based on the detection image D captured by the camera 21 (Step S2). The goods detector 25b detects goods G inside the vehicle V based on the detection image D captured by the camera 21 (Step S3).

Next, the association unit 25c determines whether or not the goods G detected by the goods detector 25b are placed near the passenger P detected by the passenger detector 25a (Step S4). The association unit 25c determines whether or not the goods G are placed near the passenger P based on, for example, the distance between the goods G detected by the goods detector 25b and the passenger P detected by the passenger detector 25a. When the goods G detected by the goods detector 25b are not placed near the passenger P detected by the passenger detector 25a (Step S4; No), the association unit 25c does not associate the goods G detected by the goods detector 25b with the passenger P detected by the passenger detector 25a. In contrast, when the goods G detected by the goods detector 25b are placed near the passenger P detected by the passenger detector 25a (Step S4; Yes), the association unit 25c associates the goods G detected by the goods detector 25b with the passenger P detected by the passenger detector 25a (Step S5). The association unit 25c associates the goods G detected by the goods detector 25b with the passenger P having a hand closest in distance to the detected goods G, for example.

Next, the association unit 25c determines whether or not the goods detector 25b has detected, for the first time, the goods G taken from a housing (e.g., a pocket of clothes and a bag) for goods worn by the passenger P (Step S6). When the goods detector 25b has detected the goods G taken from the housing for goods worn by the passenger P for the first time (Step S6; No), the association unit 25c omits the association processing. In contrast, the goods detector 25b has detected the goods P taken from the housing for goods worn by the passenger P for the first time (Step S6; Yes), the association unit 25c associates the goods G taken from the goods housing with the passenger P who has taken the goods P (Step S7). For example, when the goods detector 25b detects the smartphone taken from a pocket of clothes by the passenger P for the first time, the association unit 25c associates the smartphone taken from the pocket of clothes with the passenger P who has taken the smartphone. When the goods G associated with the passenger P are housed in the goods housing and the goods detector 25b cannot detect the goods G, the association unit 25c maintains the association between the goods G and the passenger P. For example, when the smartphone associated with the passenger P is housed in the pocket of clothes and the goods detector 25b cannot detect the smartphone, the association unit 25c maintains the association between the smartphone and the passenger P. Then, when the goods G whose association is maintained are taken from the goods housing and the goods detector 25b detects the goods G taken from the goods housing, the association unit 25c determines that the detected goods G are the same as the already associated goods G. For example, when the smartphone whose association is maintained is taken from the pocket of clothes and the goods detector 25b detects the smartphone taken from the pocket of clothes, the association unit 25c determines that the detected smartphone is the same as the already associated smartphone.

Next, the association unit 25c determines whether or not the goods detector 25b detects the goods G hidden behind the passenger P for the first time when the passenger P seated on a seat of the vehicle V moves from the seat (Step S8). In the case where the goods detector 25b does not detect the goods G hidden behind the passenger P for the first time when the passenger P seated on the seat of the vehicle V moves from the seat (Step S8; No), the association unit 25c omits the association processing. In contrast, in the case where the goods detector 25b detects the goods P hidden behind the passenger P for the first time when the passenger P seated on the seat of the vehicle V moves from the seat (Step S8; Yes), the association unit 25c associates the hidden goods G with the passenger P who has moved from the seat (Step S9).

Next, the in-vehicle controller 25e determines whether or not the distance between the goods G (belongings) and the passenger P, which have been associated by the association unit 25c, is equal to or more than the first threshold value (Step S10). When the distance between the goods G (belongings) and the passenger P, which have been associated by the association unit 25c, is less than the first threshold value (Step S10; No), the in-vehicle controller 25e does not give notification about a left object. In contrast, when the distance between the goods G (belongings) and the passenger P, which have been associated by the association unit 25c, is equal to or more than the first threshold value (Step S10; Yes), the in-vehicle controller 25e gives notification about existence of the left object toward the inside of the vehicle V (Step S11). The in-vehicle controller 25e outputs the content indicating that the passenger P has left an object inside the vehicle V from the speaker 22 to the inside of the vehicle V based on voice data preliminarily recorded in the storage 25d. Furthermore, the in-vehicle controller 25e displays the content indicating that the passenger P has left an object inside the vehicle V on the display 23 based on image data preliminarily stored in the storage 25d.

Next, the in-vehicle controller 25e determines whether or not the distance between the goods G (belongings) and the passenger P, which have been associated by the association unit 25c, is equal to or more than a second threshold value (Step S12). Here, the second threshold value is larger than the first threshold value. The second threshold value is used for the monitoring person M to notify the passenger P, who does not notice the left object despite notification about the left object inside the vehicle V, via the external server 10. When the distance between the goods G (belongings) and the passenger P, which have been associated by the association unit 25c, is less than the second threshold value (Step S12; No), the in-vehicle controller 25e does not give notification about the left object via the external server 10. In contrast, when the distance between the goods G (belongings) and the passenger P, which have been associated by the association unit 25c, is equal to or more than the second threshold value (Step S12; Yes), the in-vehicle controller 25e transmits the content indicating that the passenger P does not notice the left object (existence of the left object) to the external server 10 (Step S13). When receiving the content indicating that the passenger P does not noticed the left object from the in-vehicle device 20, the external server 10 displays an inside image of the vehicle V on the monitor 11. The external server 10 transmits the content about which the monitoring person M gives notification based on the display of the monitor 11 to the in-vehicle device 20. The in-vehicle device 20 outputs the content, which has been transmitted from the external server 10 and about which the monitoring person M gives notification, from the speaker 22 to the inside of the vehicle V.

As illustrated above, the in-vehicle device 20 according to the embodiment includes the camera 21, the passenger detector 25a, the goods detector 25b, the association unit 25c, and the in-vehicle controller 25e. The camera 21 images the inside of the vehicle V. The passenger detector 25a detects the passenger P inside the vehicle V based on the detection image D captured by the camera 21. The goods detector 25b detects the goods G inside the vehicle V based on the detection image D captured by the camera 21. The association unit 25c generates association information T. The association information T is obtained by associating specific goods G detected by the goods detector 25b with a specific passenger P detected by the passenger detector 25a based on the goods detection information and the passenger detection information. The goods detection information represents the goods G detected by the goods detector 25b. The passenger detection information represents the passenger P detected by the passenger detector 25a. The in-vehicle controller 25e performs predetermined control based on the association information T generated by the association unit 25c.

This configuration enables the in-vehicle device 20 to appropriately grasp (monitor and manage) that the passenger P has the goods G. The in-vehicle device 20 can determine, for example, the fact that the passenger P has left his/her belongings inside the vehicle V, the fact that the belongings have been stolen, the preference of the passenger P, and the possession of dangerous goods. This enables the in-vehicle device 20 to notify the passenger P that he/she has left the belongings inside the vehicle V to make the passenger P notice the left object. The in-vehicle device 20 can inhibit the damage of steal by giving notification at the moment when the belongings are stolen. The in-vehicle device 20 enables, for example, proper advertisement in a vehicle by determining the preference of the passenger P based on belongings when the passenger P has dangerous goods, the in-vehicle device 20 can prevent a case by notifying, for example, the police and a security company.

In the above-described in-vehicle device 20, the association unit 25c associates specific goods G with a specific passenger P based on the distance between the goods G detected by the goods detector 25b and the passenger P detected by the passenger detector 25a. This configuration enables the in-vehicle device 20 to properly determine that the goods G brought into the vehicle V by the passenger P are belongings of the passenger P.

In the above-described in-vehicle device 20, when the goods detector 25b detects the goods G for the first time, the association unit 25c associates the goods G detected for the first time with the passenger P closest in distance to the goods G detected for the first time. This configuration enables the in-vehicle device 20 to properly determine that the goods G brought into the vehicle V by the passenger P are belongings of the passenger P.

In the above-described in-vehicle device 20, when the distance between the goods G and the passenger P associated by the association unit 25c is equal to or more than the predetermined first threshold value, the in-vehicle controller 25e determines that the passenger P has left the goods G inside the vehicle V. This configuration enables the in-vehicle device 20 to instantly determine that the passenger P has left an object compared to the traditional case where whether or not an object is left is determined based on the weight of the passenger P. Then, the in-vehicle device 20 can notify the passenger P of the left object based on the determination result to make the passenger P notice that the passenger P has left the goods G inside the vehicle V.

Variations

Note that, although, in the above description, an example in which the vehicle system 1 is applied to the vehicle V such as, for example, a ride-sharing car, a bus, and a taxi that perform automatic driving has been described, this is not a limitation. The vehicle system 1 may be applied to the vehicle V driven by a driver.

Although an example in which the passenger detector 25a detects the passenger P and the goods G by using the pattern recognition technique for recognizing a subject based on the characteristics of the detection image D has been described, this is not a limitation. The passenger detector 25a may detect the passenger P and the goods G by using another image recognition technique.

Although an example in which the association unit 25c associates the goods G and the passenger P based on the distance between the goods G detected by the goods detector 25b and the passenger P detected by the passenger detector 25a has been described, this is not a limitation. The association unit 25c may associate the goods G with the passenger P by another method.

Although an example in which the distance between the goods G and the passenger P corresponds to the distance between the goods G and a hand of the passenger P has been described, this is not a limitation. The distance between the goods G and the passenger P may correspond to the distance between other objects (e.g., distance between the goods G and the torso of the passenger P).

Although an example in which the association unit 25c associates the goods G with the passenger P at timing when the goods detector 25b detects the goods G for the first time has been described, this is not a limitation. The association unit 25c may associate the goods G with the passenger P at another piece of timing.

Although an example in which the in-vehicle controller 25e determines that the passenger P has left the goods G inside the vehicle V when the distance between the goods G and the passenger P associated by the association unit 25c is equal to or more than the first threshold value has been described, this is not a limitation. For example, when the passenger P associated with the goods G moves out of an imaging range of the camera 21 with the goods G being left in the imaging range, that is, when the passenger P goes out of frame, the in-vehicle controller 25e may determine that the passenger P has left the goods G inside the vehicle V.

When the goods G detected by the goods detector 25b cannot be associated with the specific passenger P detected by the passenger detector 25a, the association unit 25c associates the goods G with all the passengers P (candidate passengers P) inside the vehicle V detected by the passenger detector 25a. Then, when the distance between the goods G and a candidate passenger P associated by the association unit 25c is equal to or more than the predetermined threshold value (e.g., when the candidate passenger P gets off the vehicle V), the in-vehicle controller 25e determines that the candidate passenger P has left the goods G inside the vehicle V.

When the goods G are left inside the vehicle V without the passenger P inside the vehicle V, the in-vehicle controller 25e transmits the fact to the external server 10.

When acquiring an identifier (ID) for identifying the passenger P, the in-vehicle controller 25e transmits the identifier (ID) to the external server 10.

The in-vehicle device according to the present embodiment associates specific goods detected by a goods detector with a specific passenger detected by a passenger detector based on a vehicle inside image captured by an imager, so that the in-vehicle device can appropriately grasp the belongings of a passenger.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle device comprising:
an imager that images an inside of a vehicle;
a passenger detector device that detects a passenger inside the vehicle based on an image captured by the imager;
a goods detector device that detects each of goods inside the vehicle based on the image captured by the imager;
an association device that generates association information by associating a specific one of the goods detected by the goods detector device with a specific passenger detected by the passenger detector device based on goods detection information representing each of the goods detected by the goods detector device and passenger detection information representing the passenger detected by the passenger detector device; and
a controller that performs predetermined control based on the association information generated by the association device, wherein when a distance between the specific one of the goods and the specific passenger is equal to or more than a first predetermined threshold value, the controller determines that the specific passenger has left the specific one of the goods inside the vehicle and sends at least a notification to the specific passenger that the specific one of the goods are left, and wherein the controller determines whether the distance between the specific one of the goods and the specific passenger is equal to or more than a second threshold value, the second threshold is greater than the first threshold hold, and the controller determines the specific passenger does not notice the notification if the distance is equal to or more than the second threshold and transmits information to an external server.

2. The in-vehicle device according to claim 1, wherein the association device associates the specific one of the goods with the specific passenger based on a distance between each of the goods detected by the goods detector device and the passenger detected by the passenger detector device.

3. The in-vehicle device according to claim 2, wherein when the goods detector device detects each of goods for a first time, the association device associates each of the goods that have been detected for the first time with a passenger closest in distance to each of the goods that have been detected for the first time.

\* \* \* \* \*